J. BASTAR.
Spigot and Faucet.
No. 211,954. Patented Feb. 4, 1879.
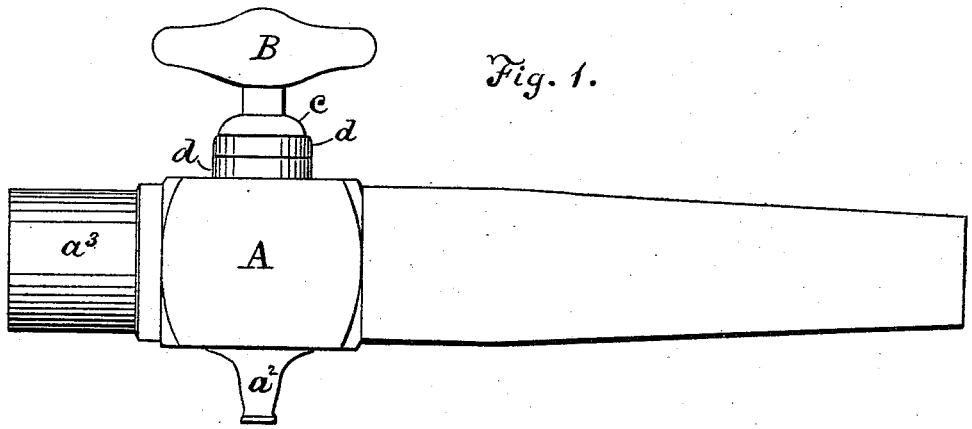
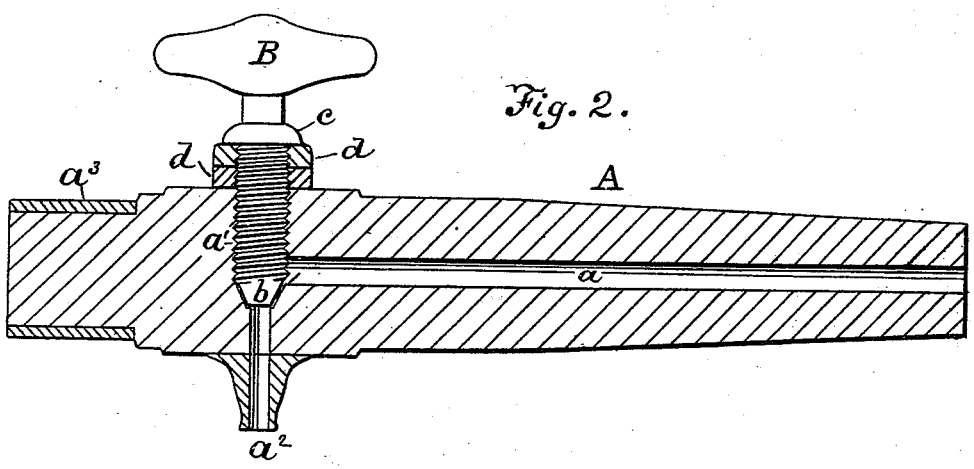

UNITED STATES PATENT OFFICE.

JOHN BASTÁR, OF ALLEGHENY, PENNSYLVANIA.

IMPROVEMENT IN SPIGOTS AND FAUCETS.

Specification forming part of Letters Patent No. 211,954, dated February 4, 1879; application filed May 25, 1878.

*To all whom it may concern:*

Be it known that I, JOHN BASTÁR, of Allegheny, in the county of Allegheny and State of Pennsylvania, have invented certain new and useful Improvements in Spigots and Faucets; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1 is a side view. Fig. 2 is a longitudinal vertical section.

My invention consists of a wooden faucet, provided with a metallic screw-spigot screwed into the wood in a socket in the faucet. The spigot is constructed with a shoulder, and provided with elastic washers forming a bearing for the shoulders, to allow the spigot to be screwed in tightly without too great pressure upon the bottom of the socket, as hereinafter more fully described.

A is the wooden faucet, having the longitudinal tube $a$ and the socket $a^1$ for the spigot and the exit-spout $a^2$, and is provided with a metallic ferrule, $a^3$, on the end, to prevent splitting or bruising the end of the spigot in driving it into the cask. B is the metallic spigot, having the screw part $b$, for screwing it tightly in the wood in the socket of the faucet.

The bottom of the socket and the end of the spigot are preferably conic shape, which, it is believed, is better for closing perfectly the faucet; but I do not limit myself to any particular shape of the socket or spigot.

The spigot is constructed with a shoulder, $c$, forming a bearing for the washers $d\ d$, which are made of leather or other suitable elastic material. These washers are made of such thickness, and the screw part $b$ of such length, as that when the spigot is screwed in, to close the faucet, the bearing of the shoulder upon the washers and the impinging of the conic end upon the bottom of the socket will be simultaneous, which allows the spigot to be screwed in more tightly than it could be without the washers without too great pressure upon the bottom of the socket; and these washers serve also to close completely the top of the socket, preventing liability of leakage if by use the socket should become worn sufficiently to allow the liquid to escape by the side of the screw.

When, in use, the bottom of the socket becomes worn so that the end of the spigot does not close it perfectly, these washers may be removed and others of the required reduced thickness adjusted in their place.

I am aware of metallic faucets having metallic screw-spigots, of wooden faucets having wooden spigots without screw-threads, and of a wooden faucet having a wooden spigot, each covered with a metallic shell or band; but I am not aware of a wooden faucet having a metallic screw-spigot screwed into the wooden faucet, the advantages of which are mainly these—viz: The yielding elastic nature of the wood allows the metallic screw-spigot to be screwed into the wooden faucet more tightly than it could possibly be in a metallic faucet.

A metallic faucet having a metallic spigot adjusted to be equally secure against leakage would require the spigot to fit so tightly as to render it difficult if not impossible to turn it. In this wooden faucet having the metallic spigot, the metallic surface exposed to the liquid is comparatively very small, being only the small surface on the spigot corresponding with the size of the tube, while in a metallic faucet the whole length of the tube and the end inserted in the cask is exposed to the liquid. The wooden faucet, therefore, is less liable to taste the liquor, less liable to rust, less expensive, and it is believed to be fully as durable.

What I claim as new, and desire to secure by Letters Patent, is—

In combination with the wooden faucet A, the metallic spigot B, having the shoulder $c$ and screw part $b$, and provided with the elastic washers $d\ d$ the required thickness to form a bearing for the shoulder of the spigot when it is screwed in to close the faucet, substantially as and for the purposes described.

In testimony that I claim the foregoing as my own I hereby affix my signature in presence of two witnesses.

JOHN BASTÁR.

Witnesses:
W. C. BERINGER,
F. M. TIERNAN.